(12) United States Patent
Sennebogen

(10) Patent No.: US 9,663,333 B2
(45) Date of Patent: May 30, 2017

(54) SELF-PROPELLED WORK MACHINE

(71) Applicant: Sennebogen Maschinenfabrik GmbH, Straubling (DE)

(72) Inventor: Erich Sennebogen, Straubling (DE)

(73) Assignee: SENNEBOGEN MASCHINENFABRIK GMBH, Straubing (DE)

( * ) Notice: Subject to any disclaimer, the term of this patent is extended or adjusted under 35 U.S.C. 154(b) by 0 days.

(21) Appl. No.: 14/953,052

(22) Filed: Nov. 27, 2015

(65) Prior Publication Data

US 2016/0176282 A1 Jun. 23, 2016

(30) Foreign Application Priority Data

Dec. 22, 2014 (EP) .................................... 14199778

(51) Int. Cl.
*B60K 1/00* (2006.01)
*B66C 23/36* (2006.01)
*E02F 9/12* (2006.01)
*E02F 9/20* (2006.01)

(52) U.S. Cl.
CPC .............. *B66C 23/36* (2013.01); *E02F 9/121* (2013.01); *E02F 9/202* (2013.01); *E02F 9/2075* (2013.01); *E02F 9/2079* (2013.01); *B60K 1/00* (2013.01); *B60Y 2200/412* (2013.01); *B60Y 2200/416* (2013.01); *Y02T 90/34* (2013.01); *Y10S 903/906* (2013.01); *Y10S 903/908* (2013.01)

(58) Field of Classification Search
CPC ...................................................... B60K 6/46
See application file for complete search history.

(56) References Cited

U.S. PATENT DOCUMENTS

| 2,631,737 | A | * | 3/1953 | Cullen | B66C 23/78 180/324 |
|---|---|---|---|---|---|
| 4,102,461 | A | | 7/1978 | Soyland | |
| 8,200,382 | B2 | * | 6/2012 | Hahn | B60K 6/48 180/65.21 |
| 2006/0213167 | A1 | * | 9/2006 | Koselka | A01D 46/30 56/10.2 A |
| 2010/0102016 | A1 | * | 4/2010 | Davis | B66C 23/36 212/294 |

(Continued)

FOREIGN PATENT DOCUMENTS

| DE | 102012201141 A1 | 8/2013 |
|---|---|---|
| EP | 2672024 A1 | 12/2013 |
| JP | S58140264 U | 9/1983 |

(Continued)

OTHER PUBLICATIONS

European Search Report, May 6, 2015.

*Primary Examiner* — John Walters
*Assistant Examiner* — James Triggs
(74) *Attorney, Agent, or Firm* — Quarles & Brady LLP

(57) ABSTRACT

A self-propelled work machine includes an undercarriage provided with drive wheels driven by a drive device. An upper structure is rotatably mounted on the undercarriage. A drive unit is arranged in the undercarriage and a boom for a work tool is mounted on the undercarriage. The drive unit drives a power generator that is a power source for an electric motor arranged in the upper structure, the electric motor being the drive device for the drive wheels arranged on the undercarriage.

9 Claims, 1 Drawing Sheet

(56) References Cited

U.S. PATENT DOCUMENTS

2014/0186191 A1    7/2014   Sasaki et al.

FOREIGN PATENT DOCUMENTS

| | | |
|---|---|---|
| JP | S61010372 U | 1/1986 |
| JP | H05147562 A | 6/1993 |
| JP | 2000283107 A | 10/2000 |
| JP | 2001207478 A | 8/2001 |
| JP | 2001207482 A | 8/2001 |
| JP | 2008157161 A | 7/2008 |
| JP | 2011080257 A | 4/2011 |

* cited by examiner

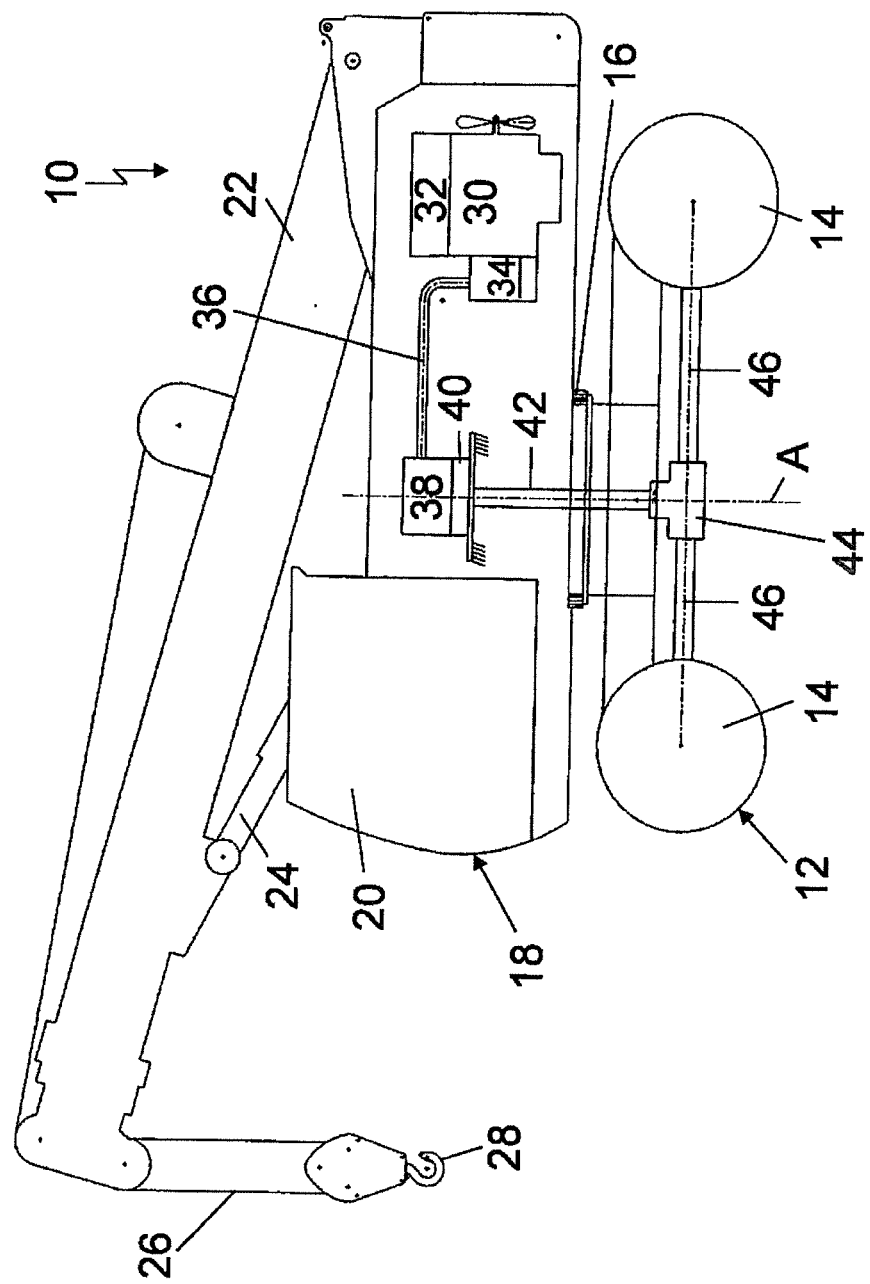

SELF-PROPELLED WORK MACHINE

CROSS-REFERENCE TO RELATED APPLICATIONS

This application claims priority to European Application No. EP 14199778.3 filed on Dec. 22, 2014, which is fully incorporated herein by reference.

STATEMENT REGARDING FEDERALLY SPONSORED RESEARCH OR DEVELOPMENT

Not applicable.

FIELD OF THE INVENTION

The invention relates to a self-propelled work machine, in particular a crane, an excavator, a material handling machine, a telehandler or the like.

BACKGROUND OF THE INVENTION

Mobile or self-propelled work machines are known from practice, such as a mobile crane that has a drivable or mobile undercarriage on which an upper structure is rotatably mounted. In the upper structure, a diesel engine is arranged, for example, which can be used to drive hydraulic units of a crane boom and to drive a hydraulic motor that is arranged in the undercarriage and by means of which the drive wheels that are mounted on the undercarriage can be driven, making the work machine mobile. To transport the hydraulic energy into the undercarriage, a hydraulic rotary union is required. Hydraulic rotary unions are technically complex, expensive and accompanied by a considerable loss in efficiency.

SUMMARY OF THE INVENTION

Hence, it is the object of the invention to provide a self-propelled work machine of the kind described above that features efficient drive of the undercarriage. Thus, a self-propelled work machine is proposed that comprises an undercarriage which is provided with drive wheels driven by means of a drive device, and that comprises an upper structure that is rotatably mounted on the undercarriage and in which a drive unit is arranged and on which a boom for a work tool is mounted. The drive unit drives a power generator that is a power source for an electric motor arranged on the upper structure, said electric motor being the drive device for at least one of the wheels mounted on the undercarriage.

In the work machine according to the invention, the drive for the undercarriage is thus arranged in the upper structure, a drive torque being transmitted into the undercarriage via corresponding shafts. This means that the driving motion is initiated in the upper structure. In the upper structure, the electric motor constituting the drive is directly connected to its power source, which is driven by the drive unit arranged in the upper structure. In contrast to the above-described known mobile work machines, energy transmission from the rotatable upper structure to the undercarriage by way of rotary unions can thus be avoided. In consequence, considerably higher efficiency can be achieved with respect to the drive for the undercarriage. This is also due to the small distance between the power source and the electric motor that constitutes the drive device for the undercarriage. Moreover, the work machine according to the invention is characterized by high compactness since all means of command and control for actuation of the work machine can be arranged in the upper structure. The considerable increase in efficiency due to the drive device for the undercarriage being arranged in the upper structure also makes it possible to use a drive unit with less power than in the state of the art. This, in turn, is accompanied by lower investment costs as well as with lower operating costs because energy consumption is substantially reduced as compared to the state of the art.

In a mobile or self-propelled work machine, the highest individual power output is required for the driving mode, said individual power output being covered by the drive power to be supplied in total. Hence, it is particularly advantageous to select an efficient drive with efficient power transmission at a high efficiency rate for the driving mode or driving function.

In a preferred embodiment of the self-propelled or mobile work machine according to the invention, a central shaft is provided that is driven by the electric motor and whose axis coincides with the axis of rotation of the upper structure. This means that the central shaft is the shaft via which the drive torque generated by the electric motor is transmitted into the undercarriage and to the drive wheel that are mounted on the undercarriage. The central shaft, which sits in the axis of rotation of the upper structure, is a simple and cost-effectively producible component via which the torque generated in the electric motor can be efficiently transmitted. The central shaft is oriented at a right angle with respect to a main plane of the undercarriage.

To be able to transmit the torque, which has been transmitted to the undercarriage via the central shaft, to the drive wheels, in an advantageous embodiment of the self-propelled work machine according to the invention, the central shaft is connected to a gearing that is arranged in the undercarriage and via which the drive wheels are driven.

The drive unit of the self-propelled work machine according to the invention can be configured in various ways. Preferably, the drive unit is a combustion engine, in particular a diesel engine.

In an alternative embodiment of the work machine according to the invention, the drive unit can also comprise a fuel cell. Operation of this embodiment is particularly environmentally friendly.

Depending on the design of the work machine according to the invention, the drive unit has a maximum output of between 50 kW and 300 kW, for example.

Advantageously, the central shaft, which is driven by the electric motor, penetrates a revolving bearing collar via which the upper structure is rotatably mounted on the undercarriage and which allows continuous rotation of the upper structure on the undercarriage.

To optimize drive power and to adjust the driving characteristics of the work machine to the respective conditions, a gearing can be arranged between the electric motor and the central shaft that is in particular realized as a transmission gearing or a manual transmission that allows continuous rotation of the upper structure on the undercarriage.

To be able to operate the work machine according to the invention with particularly high efficiency, the central shaft can be part of a recuperation system for recovering electrical energy, a storage device for the recovered electrical energy being preferably arranged in the upper structure. In particular, the storage device is an accumulator or a capacitor and is advantageously connected to the electric motor.

The self-propelled work machine according to the invention can be any kind of work machine that comprises an undercarriage that includes drive wheels and an upper structure on which a boom or the like is mounted. For example, the self-propelled work machine is a crane, an excavator, a material handling machine, a telehandler or the like.

Other advantages and advantageous embodiments of the subject-matter of the invention can be taken from the description, from the drawing and from the patent claims.

A preferred embodiment of a self-propelled work machine according to the invention is illustrated in the drawing in a schematically simplified manner and will be explained in more detail in the following paragraphs.

BRIEF DESCRIPTION OF THE DRAWINGS

FIG. 1 shows a structure of a self-propelled work machine according to the invention in a highly schematized manner.

DETAILED DESCRIPTION OF THE EXAMPLE EMBODIMENTS

The drawing shows a mobile crane 10, which constitutes a self-propelled work machine. The mobile crane 10 has a two-axle undercarriage 12, which is provided with drive wheels 14, which are part of a chassis of the undercarriage 12.

An upper structure 18 is mounted on the undercarriage 12 via a standard-design revolving bearing collar 16. An axis of rotation formed by the revolving bearing collar 16 is identified as "A" in the drawing. The revolving bearing collar 16 allows continuous rotation of the upper structure 18 on the undercarriage 12.

The upper structure 18 has a driver cabin 20, in which substantially all operating elements of the mobile crane 10 are arranged, so that said operating elements can be comfortably reached by a driver of the mobile crane 10. Furthermore, a crane boom 22, which can be realized in a telescopic manner and is provided with adjusting cylinders 24 on the one hand and with a rope hoist 26 for a crane hook 28 on the other hand, is pivotably mounted on the upper structure 18.

In the upper structure 18, a drive unit 30 is arranged, which is realized as a diesel engine and drives a hydraulic pump 32 for actuating the adjusting cylinders 24. Moreover, the drive unit 30 drives a power generator 34 that is connected to an electric motor 38 via electric lines 36. The electric motor 38, which is connected to a control device that can be controlled from the driver cabin 20, drives a central shaft 42 via a manual transmission 40, the axis of the central shaft 42 coinciding with the axis of rotation A of the upper structure 18. The central shaft 42 penetrates the revolving bearing collar 16 between the undercarriage 12 and the upper structure 18 and leads to a distribution gearing 44 that is arranged in the undercarriage 12 and that is connected to the drive wheels 14 of the undercarriage 12 via shafts 46.

In the mobile crane described above, an electric motor that is arranged in the upper structure and is supplied by a power generator 34 thus drives the drive wheels 14 of the undercarriage 12 via the mechanical central shaft 42, which penetrates the revolving bearing collar 16. A driving motion of the mobile crane 10 is thus initiated by actuation of a drive device in the form of an electric motor 38 arranged in the upper structure 18.

The invention claimed is:

1. A self-propelled work machine comprising:
an undercarriage provided with drive wheels;
an upper structure rotatably mounted on the undercarriage;
an electric motor arranged in the upper structure driving said drive wheels provided on said undercarriage;
a drive unit arranged in the upper structure;
a boom mounted on the upper structure; and
a power generator driven by the drive unit, said power generator providing power to the electric motor to drive said drive wheels provided on said undercarriage.

2. The self-propelled work machine according to claim 1, in which a central shaft that is driven by the electric motor and whose axis coincides with an axis of rotation (A) of the upper structure.

3. The self-propelled work machine according to claim 2, in which the central shaft is connected to a gearing that is arranged in the undercarriage and via which the drive wheels are driven.

4. The self-propelled work machine according to claim 2, in which the central shaft penetrates a revolving bearing collar via which the upper structure is rotatably mounted on the undercarriage.

5. The self-propelled work machine according to claim 2, characterized in that a gearing is arranged between the electric motor and the central shaft.

6. The self-propelled work machine according to claim 2, in which the central shalt is part of a recuperation system for recovering electrical energy, and a storage device for the recovered electrical energy is arranged in the upper structure.

7. The self-propelled work machine according to claim 1, in which the drive unit is a combustion engine.

8. The self-propelled work machine according to claim 1, in which the drive unit includes a fuel cell.

9. The self-propelled work machine according to claim 1, in which the work machine is a crane, an excavator, a material handling machine or a telehandler.

* * * * *